US012213177B2

(12) United States Patent
Guo et al.

(10) Patent No.: US 12,213,177 B2
(45) Date of Patent: *Jan. 28, 2025

(54) SUSPENDABLE CSMA/CA FOR IEEE 802.15.4 SYSTEM TO REDUCE PACKET DISCARD CAUSED BY BACKOFF FAILURE

(71) Applicants: Mitsubishi Electric Research Laboratories, Inc., Cambridge, MA (US); Mitsubishi Electric Corporation, Tokyo (JP)

(72) Inventors: Jianlin Guo, Newton, MA (US); Yukimasa Nagai, Tokyo (JP); Takenori Sumi, Tokyo (JP); Kieran Parsons, Gloucester, MA (US); Philip Orlik, Cambridge, MA (US); Pu Wang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,217

(22) Filed: Nov. 13, 2023

(65) Prior Publication Data

US 2024/0381425 A1  Nov. 14, 2024

Related U.S. Application Data

(63) Continuation of application No. 18/474,291, filed on Sep. 26, 2023.
(Continued)

(51) Int. Cl.
*H04W 74/0816* (2024.01)

(52) U.S. Cl.
CPC .............. *H04W 74/0816* (2013.01)

(58) Field of Classification Search
CPC ................................. H04W 74/0816
See application file for complete search history.

(56) References Cited

U.S. PATENT DOCUMENTS

| 10,361,835 B2 | 7/2019 | Guo et al. |
| 11,166,315 B2 | 11/2021 | Guo et al. |

(Continued)

*Primary Examiner* — Saad A. Waqas
(74) *Attorney, Agent, or Firm* — Gene Vinokur

(57) ABSTRACT

A computer-executed method is provided for IEEE 802.15.4 devices based on a suspendable carrier-sense multiple access with collision avoidance (CSMA/CA) control program and standard CSMA/CA control program for an IEEE 802.15.4 network composing of IEEE 802.15.4 devices. The computer-executed method is provided on an IEEE 802.15.4 device, and causes a processor of the IEEE 802.15.4 device to perform steps that include determining the permission of backoff suspension and the intention of IEEE 802.15.4 device to perform backoff suspension, selecting the suspendable CSMA/CA control program if the backoff suspension is permitted and IEEE 802.15.4 device intends to perform backoff suspension. The suspendable CSMA/CA control program is configured to perform active CCA within each unit backoff period and suspend backoff if channel is detected to be busy, performing a CCA when backoff completes, transmitting frame when the detected channel status is an idle state or incrementing a number of backoff (NB) when the detected channel status is an busy state, determining if a NB exceeds the macMaxCSMABackoffs, incrementing a number of retransmissions (NR) when a NB exceeds the macMaxCSMABackoffs, and discarding frame when a NR exceeds macMaxFrameRetries.

20 Claims, 12 Drawing Sheets

Related U.S. Application Data

(60) Provisional application No. 63/465,936, filed on May 12, 2023.

(56) References Cited

U.S. PATENT DOCUMENTS

| | | |
|---|---|---|
| 11,622,384 B2 | 4/2023 | Guo et al. |
| 2009/0103501 A1* | 4/2009 | Farrag ................. H04W 74/02 370/337 |
| 2015/0124722 A1* | 5/2015 | Seok ................ H04W 72/0453 370/329 |
| 2017/0245261 A1* | 8/2017 | Cariou ................. H04W 72/21 |
| 2022/0046706 A1* | 2/2022 | Maallem ........... H04W 36/0007 |

* cited by examiner

| Bits:0 | 1 | 2 | 3 | 4 | 5 | 6 | 7 |
|---|---|---|---|---|---|---|---|
| Reserved | Device Type | Power Source | Receiver On When Idle | Association Type | Suspendable CSMA/CA | Security Capability | Allocate Address |

↑ Invented bit

FIG. 9A

| Bits:0 | 1 | 2 | 3 | 4 | 5 | 6 | 7 |
|---|---|---|---|---|---|---|---|
| Reserved | Device Type | Power Source | Receiver On When Idle | Association Type | Suspendable CSMA/CA | Security Capability | Allocate Address |

↑ Invented bit

FIG. 9B

| Association Status | 0x00 | 0x01 | 0x02 | 0x03 | 0x04 | 0x05-0x7f | 0x80 | 0x81-0xff |
|---|---|---|---|---|---|---|---|---|
| Description | Association successful | PAN at capacity | PAN access denied | Hopping sequence offset duplication | Suspendable CSMA/CA association successful | Reserved | Fast association successful | Reserved |

← Invented status

FIG. 9C

SUSPENDABLE CSMA/CA FOR IEEE 802.15.4 SYSTEM TO REDUCE PACKET DISCARD CAUSED BY BACKOFF FAILURE

CROSS REFERENCE TO RELATED APPLICATION

This application claims priority benefit under 35 U.S.C. § 120 of copending, U.S. Non-provisional patent application Ser. No. 18/474,291, filed on Sep. 26, 2023, which claims the benefit of U.S. Provisional Patent Application No. 63/465,936, filed on May 12, 2023, the contents of each of which are incorporated herein by reference in their entireties and benefits of each are fully claimed.

FIELD OF THE INVENTION

This invention relates generally to channel access in wireless communication networks, and particularly to channel access of IEEE 802.15.4 systems.

BACKGROUND OF THE INVENTION

With the advent of 5G and beyond communication technologies, the consumer Internet of Things (IoT) devices are becoming more capable to support IoT applications. The size of IoT networks has been rapidly growing from hundreds to thousands. As more and more devices contend for channel access, the efficiency of channel access mechanism becomes critical issue to be addressed.

In addition, to meet the diverse IoT application requirements, a broad range of wireless communication technologies have been developed to cater the diverse IoT applications such as smart meter and smart city. However, the spectrum allocation is constrained. Accordingly, multiple heterogeneous wireless networks may be forced to coexist and compete for spectrum resource. Therefore, the interference among networks using different communication technologies can cause channel access to be more competitive, which further elevates the requirement on the efficiency of channel access mechanism.

IEEE 802.15.4 is a commonly referred wireless standard family developed for indoor and outdoor applications. IEEE 802.15.4 standards have been widely implemented in commercial products such as Bluetooth and smart meter. IEEE 802.15.4 are designed to operate in Sub-1 GHz (SIG) band and 2.4 GHz band, e.g., IEEE 802.15.4g can operate in both Sub-1 GHz band and 2.4 GHz band. An IEEE 802.15.4 network may consist of hundreds to thousands of devices that compete for channel access and cause data loss due to backoff failure. IEEE 802.15.4 uses carrier sense multiple access with collision avoidance (CSMA/CA) mechanism for channel access. For each channel access attempt, IEEE 802.15.4 does not perform clear channel assessment (CCA) during backoff periods and only performs CCA after backoff process completes. This approach works well for light traffic networks, but it does not work well for heavy traffic networks, especially while coexisting with more aggressive interfering networks such as IEEE 802.11 networks. Therefore, new channel access mechanisms need to be provided for IEEE 802.15.4 systems.

In IEEE 802.15.4 CSMA/CA mechanism, the term backoff means delay. Therefore, the term backoffs means multiple delays. As a result, the backoff time means delay time. In addition, the backoff failure means CSMA/CA algorithm failure, which returns either success status or failure status. Furthermore, the data structure used to contain data has different names at different layers, e.g., the data structure is named as packet at network layer and the data structure is called as frame at MAC layer.

IEEE 802.15.4 CSMA/CA algorithm is divided into two branches as show in FIG. 3, time synchronized channel hopping (TSCH) branch and non-TSCH branch. The TSCH mechanism uses time division multiple access (TDMA) to ensure no transmission conflict among devices within an IEEE 802.15.4 network. In the TSCH mechanism, CCA can be used to detect the transmissions of interfering networks such as another IEEE 802.15.4 network or an IEEE 802.11 network. In the non-TSCH branch, the CSMA/CA is used, where the efficiency of CSMA/CA mechanism needs to be improved.

Accordingly, it is desirable to provide new channel access methods for IEEE 802.15.4 to achieve better performance.

SUMMARY OF THE INVENTION

Some embodiments are based on the recognition that IEEE 802.15.4 CSMA/CA mechanism is designed for low data rate and low power devices, whose energy saving is critical. Accordingly, IEEE 802.5.4 CSMA/CA mechanism does not support backoff suspension and therefore, does not fit emerging devices without energy constraint well, e.g., electric smart meters.

To that end, it is one object of some embodiments to provide suspendable CSMA/CA mechanism for IEEE 802.15.4 to support backoff suspension, which can reduce probability of packet drop caused by backoff failure as illustrated in FIG. 4.

Accordingly, some embodiments of the invention provide suspendable CSMA/CA mechanism to IEEE 802.15.4 standards for non-TSCH channel access, wherein the CCA is actively performed within each of unit backoff period and the backoff process is suspended once the channel is detected to be busy.

Some embodiments are based on the recognition that in non-slotted CSMA/CA, first backoff period and CCA period can start at any time. However, in slotted CSMA/CA, first backoff period and CCA period must start at backoff period boundary.

Accordingly, backoff suspension must not violate the backoff boundary rule in slotted CSMA/CA.

Some embodiments are based on the recognition that energy saving is critical for battery powered devices. However, for devices such as electric smart meters connected to powerline, the energy is not constrained. These devices can actively perform CCA to increase their channel access opportunities and reduce probability of backoff failure.

Some embodiments are based on the recognition that the macMaxCSMABackoffs, i.e., the maximum number of times the CSMA/CA algorithm can delay, specified in IEEE 802.15.4 CSMA/CA mechanism is designed to limit the number of backoffs (NB). Once NB exceeds the threshold macMaxCSMABackoffs, the packet is discarded. As more and more devices contend for channel access, the NB can quickly reach the threshold macMaxCSMABackoffs. As a result, the IEEE 802.15.4 packet can be discarded.

To that end, the suspendable CSMA/CA allows backoff suspension, which in turn slows down the increase of NB by suspending backoff process to avoid packet discard when the NB exceeds the macMaxCSMABackoffs. With suspendable CSMA/CA, the CCA after backoff is only performed when channel is idle in last unit backoff period instead of performing CCA blindly after backoff completion. The blind CCA increases probability of backoff failure as illustrated in FIG. 4.

Some embodiments are based on the recognition that suspendable CSMA/CA may cause backoff process to hold for indefinitely long, which is not desirable.

To that end, the suspendable CSMA/CA mechanism defines a maximum backoff time (BT) threshold macSuspendedCSMAMaxTime, which is the maximum time the suspendable CSMA/CA algorithm can delay in a backoff. Once BT exceeds the threshold macSuspendedCSMAMaxTime, the suspendable CSMA/CA algorithm terminates with failure status.

According to some embodiments of the present invention, a computer-executed method is provided for performing a suspendable carrier-sense multiple access with collision avoidance (CSMA/CA) control program in an IEEE 802.15.4 network composing of IEEE 802.15.4 devices. In this case, the computer-executed method causes a processor of the IEEE 802.15.4 device to perform steps that comprise: determining permission of backoff suspension by receiving an Association Response Command from a network manager of the IEEE 802.15.4 network; obtaining intention of the IEEE 802.15.4 device to perform a backoff suspension contained in a suspendable CSMA/CA field of an Association Request Command; selecting a suspendable CSMA/CA control program from a memory if the backoff suspension is permitted and the IEEE 802.15.4 device intends to perform the backoff suspension, wherein the suspendable CSMA/CA control program performs steps of: performing active CCA within each of unit backoff periods; suspending a backoff process when a channel status of the IEEE 802.15.4 network is detected to be busy; and resuming the backoff process once the channel status is detected to be idle; and determining if a backoff time exceeds a pre-defined threshold macSuspendedCSMAMaxTime; and transmitting a data frame when the detected channel status is the idle or incrementing a number of backoffs (NB) when the detected channel status is a busy state; determining if the NB exceeds a macMaxCSMABackoffs; incrementing a number of retransmissions (NR) when the NB exceeds the macMaxCSMABackoffs, and discarding the data frame when the NR exceeds a macMaxFrameRetries.

Further, some embodiments of the present invention provide a network device for performing suspendable carrier-sense multiple access with collision avoidance (CSMA/CA) in an IEEE 802.15.4 network. The network device may include a processor; and a memory configured to store a CSMA/CA mode control program that causes the processor to perform steps of: determining permission of backoff suspension by receiving an Association Response Command from a network manager of the IEEE 802.15.4 network; obtaining intention of the IEEE 802.15.4 device to perform backoff suspension contained in a suspendable CSMA/CA field of an Association Request Command; selecting a suspendable CSMA/CA control program from the memory if the backoff suspension is permitted and the IEEE 802.15.4 device intends to perform the backoff suspension, wherein the suspendable CSMA/CA control program is configured to perform: performing active CCA within each of unit backoff periods; suspending a backoff process when a channel of the IEEE 802.15.4 network is detected to be busy; and resuming the backoff process once a state of the channel is detected to be idle; and determining if a backoff time exceeds a predefined threshold macSuspendedCSMAMaxTime; and transmitting data frame when a detected status is the idle or incrementing a number of backoffs (NB) when the detected channel status is a busy state; determining if the NB exceeds a macMaxCSMABackoffs; incrementing a number of retransmissions (NR) when the NB exceeds the macMaxCSMABackoffs, and discarding the data frame when the NR exceeds a macMaxFrameRetries.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 9A shows the invented Capability Information field of the Association Request Command, according to embodiments of the present invention;

FIG. 9B shows the invented Capability Information field of the DSME Association Request Command, according to embodiments of the present invention; and FIG. 9C shows the invented Association Status field of the Association Response Command, according to embodiments of the present invention.

DETAILED DESCRIPTION OF THE PREFERRED EMBODIMENTS

Figure 1:
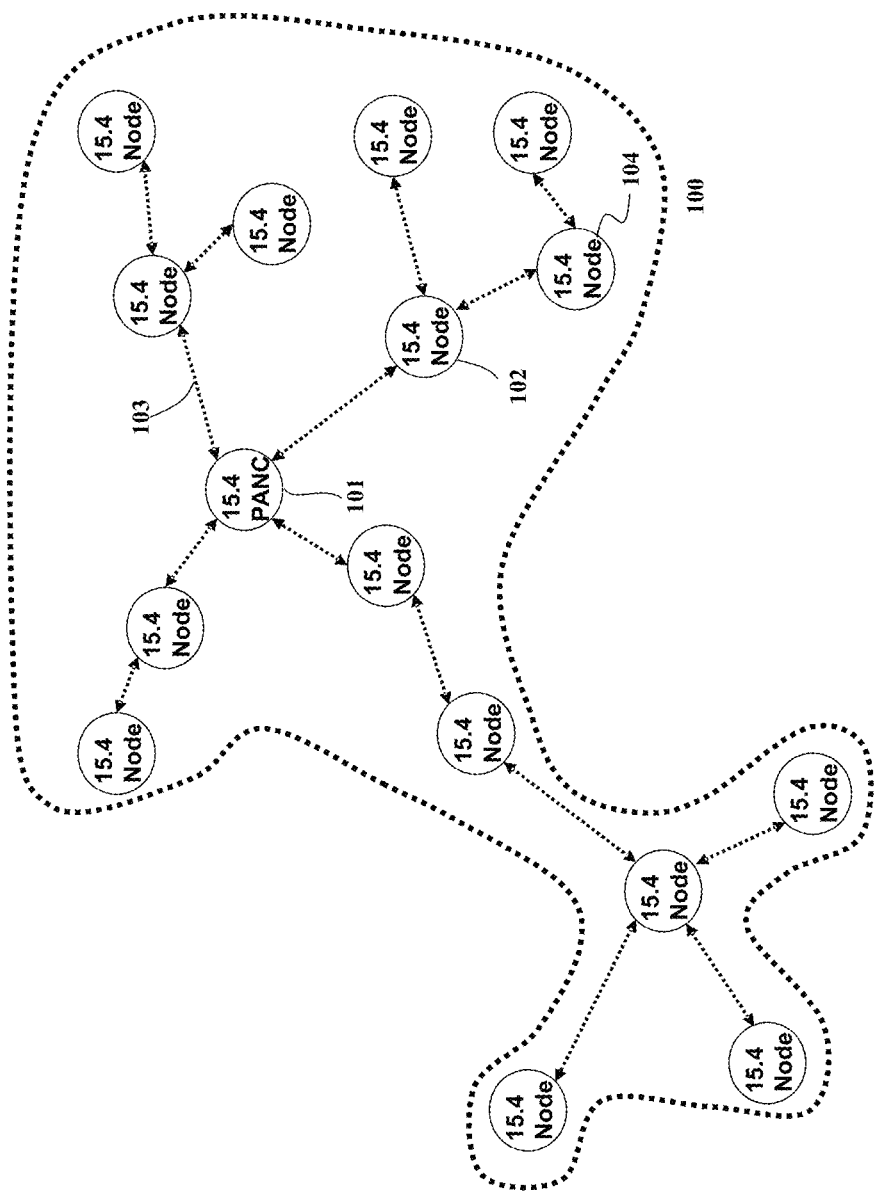
FIG. 1 is a schematic diagram of IEEE 82.15.4 network, according to some embodiments of the present invention.

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

IEEE 802.15.4 standard family is a widely used wireless technologies for various indoor and outdoor applications, e.g., IEEE 802.15.4g is a standard in IEEE 802.15.4 standard family designed for outdoor wireless smart utility networks (Wi-SUN), where electric smart meters do not have energy constraint.

FIG. 1 shows a schematic of the IEEE 802.15.4 network 100 that contains a Personal Area Network Coordinator (PANC) 101 and the associated nodes. PANC and nodes communicate using IEEE 802.15.4 wireless link 103.

The topology of IEEE 802.15.4 network can be star, mesh or tree, e.g., IEEE 802.15.4 network 100 shown in FIG. 1 is tree topology. In some cases, an IEEE 802.15.4 network 100 can be an IEEE 802.15.4 based smart meter network configured as tree topology. It should be noted that the connections of the tree type configurations can be changed according to the states of communications. In addition, it is not necessary for all nodes to have a direct connection with PANC 101. In other words, an IEEE 802.15.4 node can communicate with the PANC 101 by a multi-hop manner, e.g., IEEE 802.15.4 Node 104 can communicate with the PANC 101 via intermediate IEEE 802.15.4 Node 102.

Figure 2A:
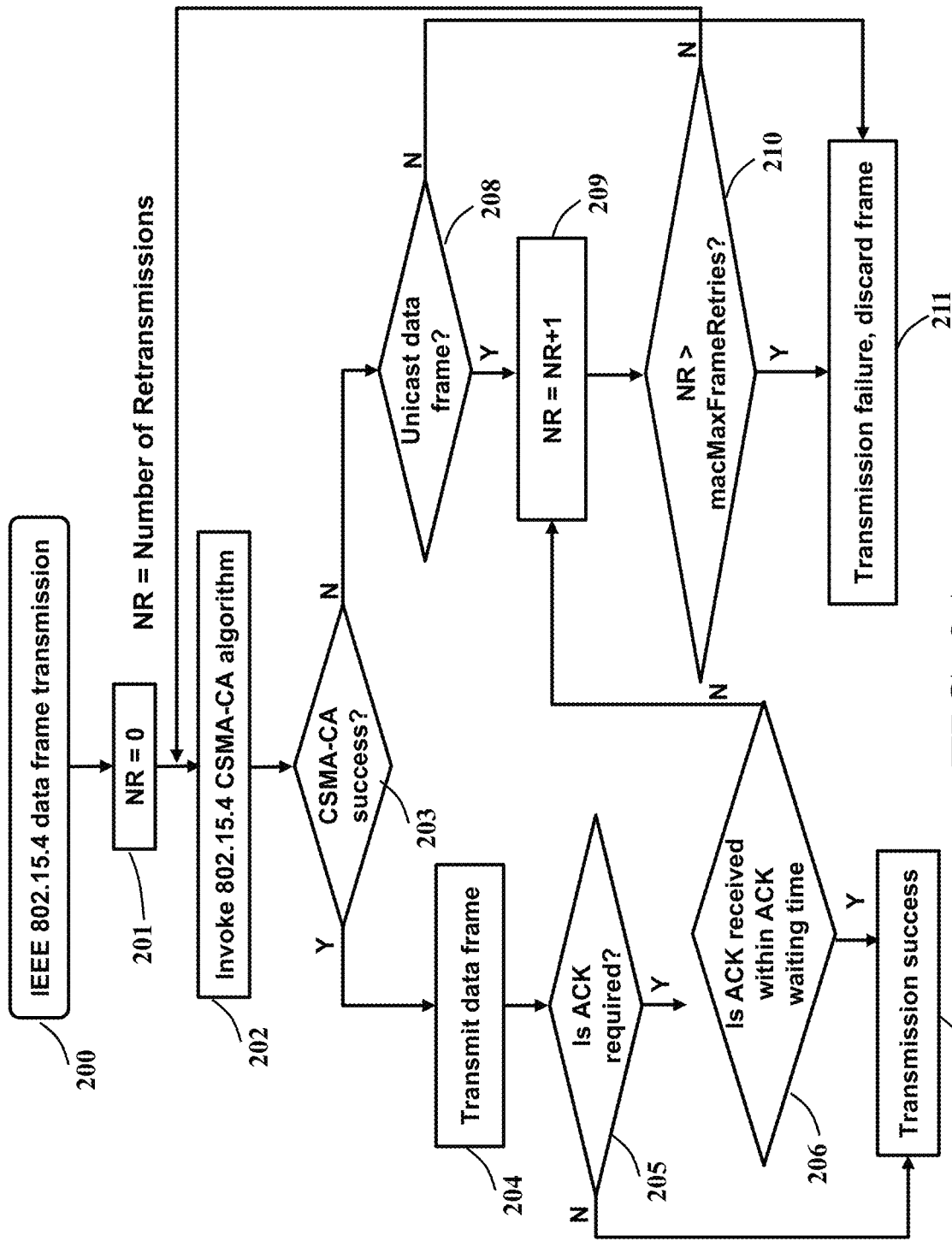
FIG. 2A depicts IEEE 802.15.4 data transmission flow diagram and transmission status report to the upper layers, according to embodiments of the present invention.
Figure 3:
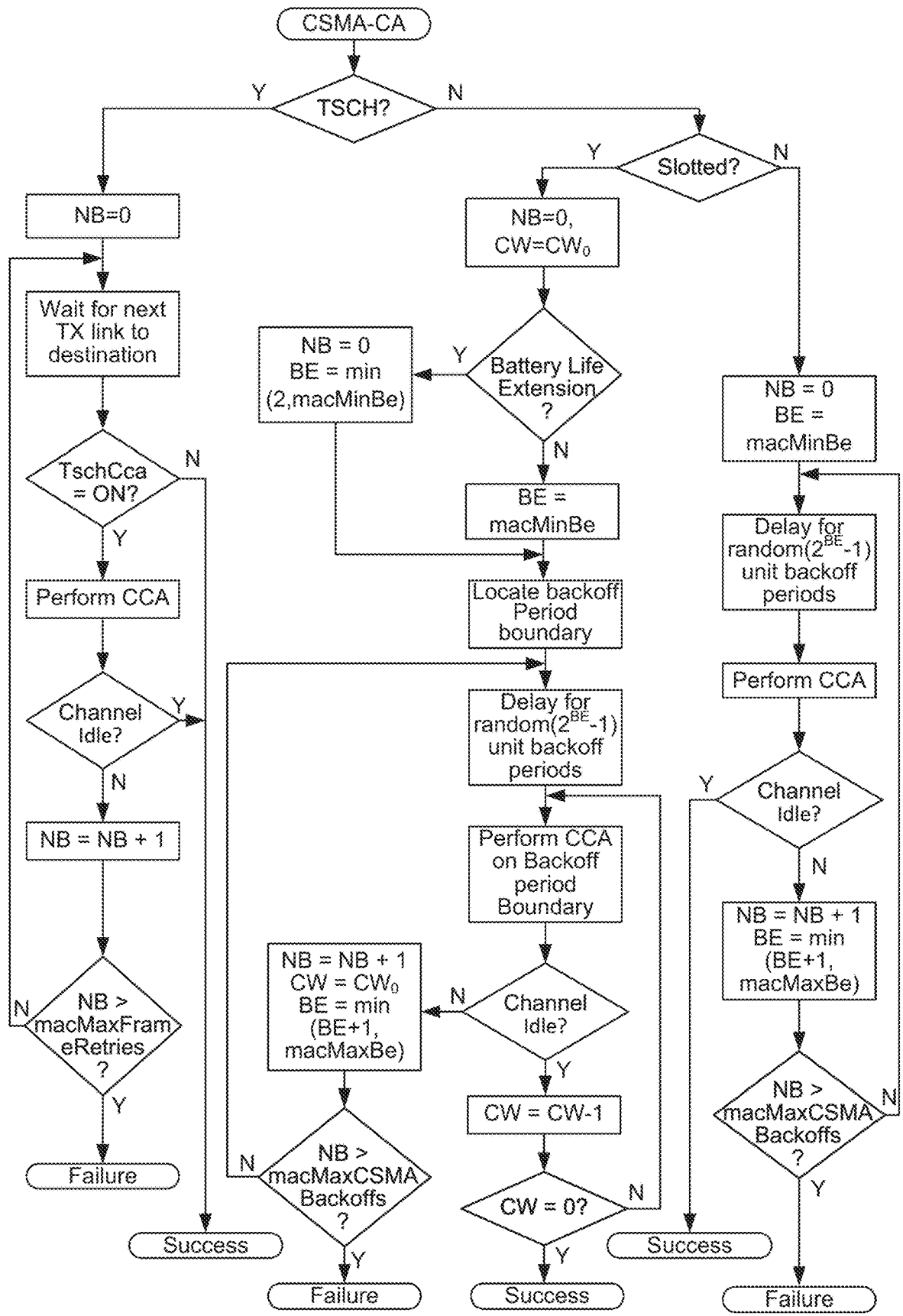
FIG. 3 shows standard carrier sense multiple access with collision avoidance (CSMA/CA) algorithm specified in IEEE 802.15.4-2020, according to embodiments of the present invention.

FIG. 2A shows IEEE 802.15.4 data frame transmission procedure 200. IEEE 802.15.4 MAC sets 201 the number of retransmissions (NR) to 0 and then invokes 202 the CSMA/CA algorithm, where the standard IEEE 802.15.4-2020 CSMA/CA algorithm is depicted in FIG. 3.

If the CSMA/CA algorithm returns success status 203, the channel is detected to be idle and therefore, the frame transmission starts 204. If the ACK is not required (AckTX=0) for frame 205, IEEE 802.15.4 MAC concludes transmission success 207 and responds to the upper layers using Data Confirm interface with transmission success status. If the ACK is required (AckTX=1) 205 and the ACK is received within the ACK waiting time period 206, IEEE 802.15.4 also concludes transmission success 207 and responds to upper layers using Data Confirm interface with transmission success status. If the ACK is required and the ACK is not received within the ACK waiting time period 206, IEEE 802.15.4 MAC increments 209 NR by 1 and checks if the NR exceeds the threshold macMaxFrameRetries 210. If yes, IEEE 802.15.4 MAC concludes the frame transmission failure and discards frame 211. IEEE 802.15.4 MAC then responds to upper layers using Data Confirm interface with NO_ACK status. If the NR is smaller than or equal to the threshold macMaxFrameRetries 210, IEEE 802.15.4 MAC goes for another transmission attempt.

If the CSMA/CA algorithm returns failure status 203, IEEE 802.15.4 MAC checks if the frame is unicast frame 208. If no, IEEE 802.15.4 MAC concludes the transmission failure and discards the frame 211. IEEE 802.15.4 MAC then responds to upper layers using Data Confirm interface with CHANNEK_ACCESS_FAILURE status. If the frame is unicast frame 208, IEEE 802.15.4 MAC increments 209 NR by 1 and then checks if the NR exceeds the threshold macMaxFrameRetries 210. If yes, IEEE 802.15.4 MAC concludes the transmission failure and discards frame 211. IEEE 802.15.4 MAC then responds to upper layers using Data Confirm interface with CHANNEK_ACCESS_FAILURE status. If the NR is smaller than or equal to the threshold macMaxFrameRetries, IEEE 802.15.4 MAC goes for another transmission attempt.

Figure 2B:
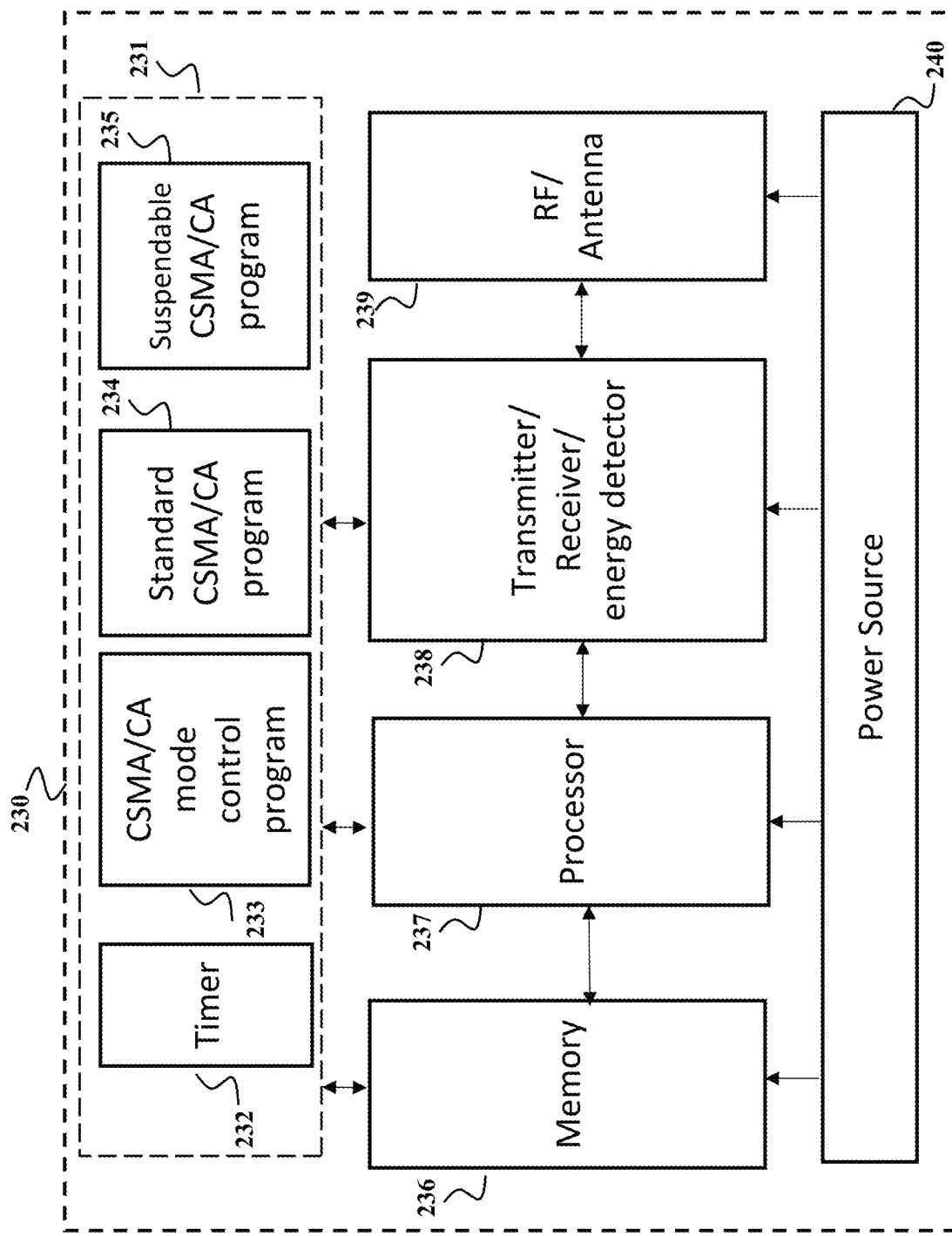
FIG. 2B is a schematic of a structure of an IEEE 802.15.4 CSMA/CA device participating in forming the networks of FIG. 1, according to embodiments of the present invention.

FIG. 2B shows an example of a structure of an IEEE 802.15.4 device participating in forming the networks of FIG. 1, in which an IEEE 802.15.4 device 230 may include a memory 236, a processor 237, a power source 240, a transceiver 238 including transmitter, receiver and energy detector and a RF antenna 239. Further, control programs are included in a storage 231 in connection with the memory 236, the processor 237 and the transceiver 238. The control programs 231 include a CSMA/CA mode control program 233, a standard CSMA/CA program 234, a suspendable CSMA/CA program 235, and a timer 232 that is used by the transceiver 238 to perform the CSMA/CA mode control program 233. Depending on the permission of the backoff suspension and intention of IEEE 802.15.4 device 230 on backoff suspension, the CSMA/CA mode control program 233 can either call standard IEEE 802.15.4 CSMA/CA program 234 or suspendable CSMA/CA program 235.

FIG. 3 shows standard CSMA/CA algorithm specified in the IEEE 802.15.4-2020. The embodiments of the present invention provide suspendable CSMA/CA for the non-TSCH IEEE 802.15.4 network. Therefore, only non-TSCH branch in FIG. 3 is described below.

Each device maintains three variables for each transmission attempt: the number of backoffs (NB), the contention window length (CW) and the backoff exponent (BE). NB is the number of times the CSMA/CA algorithm was required to back off while attempting the current transmission. CW is the number of backoff periods that need to be clear of channel activity before the transmission can commence. In addition, a $CW_0$ with default 2 is also defined. BE is related to how many backoff periods a device needs to wait before attempting to assess channel.

For the non-slotted IEEE 802.15.4 network, i.e., the beacon unenabled network, the standard IEEE 802.15.4 CSMA/CA algorithm initials NB to 0 and BE to macMinBE. The CSMA/CA algorithm then delays random number of unit backoff periods with the random number drawn uniformly within interval $[0, 2^{BE}-1]$, where BE starts with the macMinBE and increases until to the macMaxBE. When the random backoff/delay completes, the CSMA/CA algorithm performs CCA operation. If the channel is detected to be idle, the CSMA/CA algorithm reports success and the frame transmission starts. If the channel is detected to be busy, the CSMA/CA algorithm updates NB and BE as NB=NB+1 and BE=min{BE+1, macMaxBE}. If the NB exceeds the threshold macMaxCSMABackoffs, the CSMA/CA algorithm terminates with failure status. Otherwise, CSMA/CA algorithm continues, i.e., goes to do another random backoff/delay.

For the slotted IEEE 802.15.4 network, i.e., the beacon enabled network, the standard IEEE 802.15.4 CSMA/CA algorithm initials NB to 0 and CW to CW0. If Battery Life Extension is enabled, BE is set to min{2, macMinBE}. Otherwise, BE is set to macMinBE. The CSMA/CA algorithm then locates backoff period boundary, where the start of the first backoff period of each device is aligned with the start of the beacon transmission. At the boundary, CSMA/

CA algorithm delays random number of unit backoff periods with the random number drawn uniformly within interval [0, $2^{BE}-1$], where BE starts with the macMinBE and increases until to the macMaxBE. When the random backoff/delay completes, the CSMA/CA algorithm performs CCA operation on backoff period boundary. If the channel is idle, the CSMA/CA algorithm reduces CW by 1. If CW=0, CSMA/CA algorithm reports success and the frame transmission starts. Otherwise, If CW>0, CSMA/CA algorithm continues with another CCA on backoff period boundary. After each CCA, if the channel is busy, the CSMA/CA algorithm updates NB, CW and BE as NB=NB+1, CW=$CW_0$ and BE=min{BE+1, macMaxBE}. If the NB exceeds the threshold macMaxCSMABackoffs, the CSMA/CA algorithm terminates with failure status. Otherwise, CSMA/CA algorithm continues, i.e., goes to do another random backoff/delay.

For the non-TSCH network, the standard IEEE 802.15.4 CSMA/CA algorithm performs the random backoff/delay first no matter how long channel has been idle. Using this "Backoff+CCA" based CSMA/CA mechanism, the CCA is performed blindly and therefore, it decreases channel access probability as illustrated in FIG. 4.

IEEE 802.15.4 CSMA/CA Failure Packet Discard

In IEEE 802.15.4, data frame transmission failure is incurred by a) CSMA/CA failure or b) transmission failure. The CSMA/CA failure occurs when CSMA/CA algorithm terminates with a failure status because the NB exceeds the threshold macMaxCSMABackoffs as shown in FIG. 2A. Transmission failure occurs because of unsuccessful frame transmission or unsuccessful acknowledgement transmission or later acknowledgement receiving. For each CSMA/CA failure or transmission failure, the number of retransmissions (NR) is increased by 1. An IEEE 802.15.4 frame is discarded with CHANNEL_ACCESS_FAILURE status when the NR exceeds the threshold macMaxFrameRetries due to CSMA/CA failure. An IEEE 802.15.4 frame is discarded with NO_ACK status when the NR exceeds the threshold macMaxFrameRetries due to transmission failure. Other transmissions can cause CSMA/CA backoff failure as shown in FIGS. 4, which can in turn cause packet discard of IEEE 802.15.4 devices.

Figure 4:
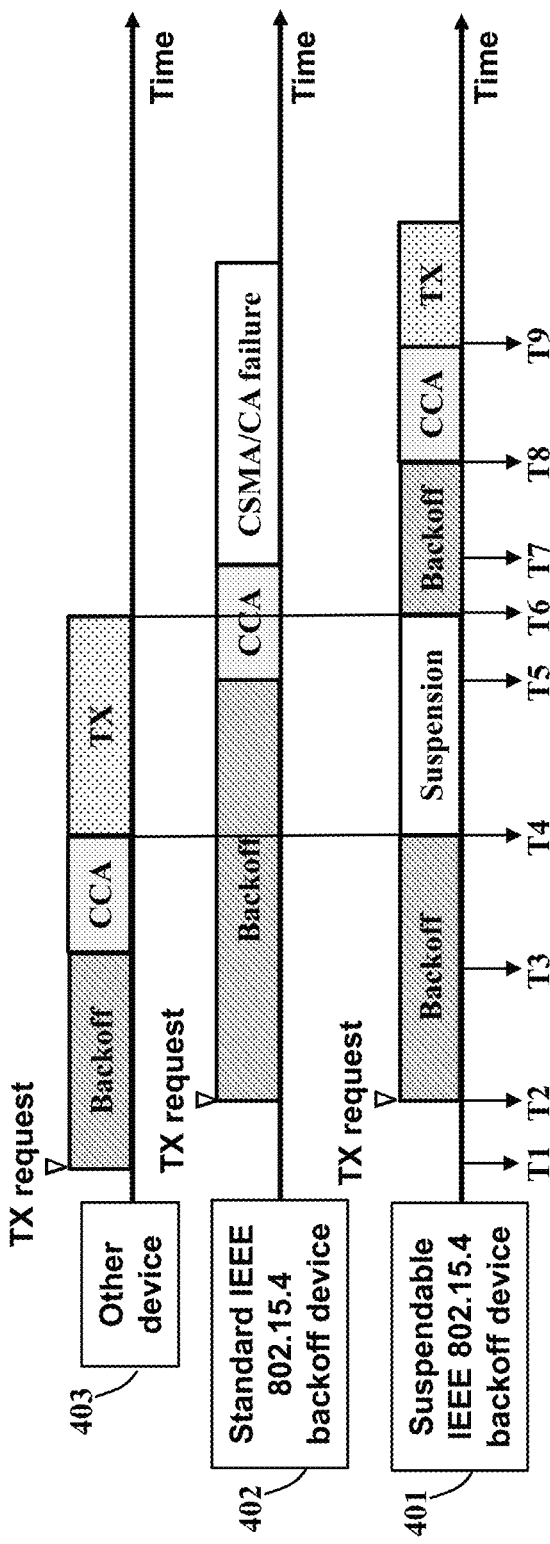
FIG. 4 illustrates that standard IEEE 802.15.4 CSMA/CA algorithm can cause more backoff failure compared with suspendable IEEE 802.15.4 CSMA/CA algorithm, according to embodiments of the present invention.

FIG. 4 shows an example of standard IEEE 802.15.4 CSMA/CA backoff failure caused by other transmission. However, the suspendable CSMA/CA program 235 avoids the backoff failure by suspending the backoff process. In FIG. 4, both suspendable IEEE 802.15.4 backoff device 401 and standard IEEE 802.15.4 backoff device 402 receive data transmission request at time T2 and therefore, start backoff at time T2. They also draw the same number of the unit backoff periods and therefore, need to backoff for the same amount of time. However, at earlier time T1, other device 403 receives data transmission request and starts backoff. At time T3, other device 403 finishes backoff and starts CCA operation. At time T4, other device 403 completes CCA and detects idle channel, and therefore, starts data transmission. Suspendable IEEE 802.15.4 backoff device 401 performs active CCA within each of unit backoff periods and detects transmission of other device 403, and therefore, suspends its backoff process. On the other hand, standard IEEE 802.15.4 backoff device 402 does not suspend its backoff and completes backoff at time T5, and therefore, performs CCA at time T5. However, at time T5, other device 403 is still transmitting. As a result, standard IEEE 802.15.4 backoff device 402 detects busy channel and returns backoff failure at time T7. Meanwhile, suspendable IEEE 802.15.4 backoff device 401 detects the end of other device transmission at time T6 and resumes remaining backoff. At time T8, the suspendable IEEE 802.15.4 backoff device 401 completes backoff and starts CCA, which ends at time T9 and reports idle channel. Accordingly, the suspendable IEEE 802.15.4 backoff device 401 successfully transmits its data at time T9 without backoff failure.

FIG. 4 clearly shows that the standard IEEE 802.15.4 CSMA/CA mechanism can cause more packet discard compared with suspendable IEEE 802.15.4 CSMA/CA mechanism.

Suspendable CSMA/CA for IEEE 802.15.4

Some embodiments of the invention provide the suspendable CSMA/CA for IEEE 802.15.4 to address CSMA/CA failure packet discard caused by other transmissions.

To allow IEEE 802.15.4 devices to perform suspendable CSMA/CA, a Suspendable CSMA/CA field is defined. The Suspendable CSMA/CA field=1 indicating backoff suspension is allowed. In this case, IEEE 802.15.4 devices may suspend backoff in CSMA/CA algorithm. If IEEE 802.15.4 devices intend to perform backoff suspension, the non-slotted Suspendable CSMA-CA algorithm 504 or the slotted Suspendable CSMA-CA algorithm 521 is invoked depending on whether IEEE 802.15.4 network is slotted or not. The Suspendable CSMA/CA field=0 indicating backoff suspension is not permitted. In this case, IEEE 802.15.4 devices cannot perform backoff suspension in CSMA/CA algorithm. The default value of Suspendable CSMA/CA field is 0, i.e., Suspendable CSMA/CA field is initialized to 0 and backoff suspension is not permitted.

The backoff suspension permission can be determined by region regulator or network manager or application developer or combination of them, e.g., in the United States, more spectrum is allocated to IEEE 802.15.4 communications and therefore, backoff suspension may not be needed, and in Japan, less spectrum is allocated to IEEE 802.15.4 communications and therefore, backoff suspension may be needed.

In an IEEE 802.15.4 network, the Personal Area Network Coordinator (PANC), i.e., network manager, and devices can realize the Suspendable CSMA-CA algorithm via invented Capability Information field of the Association Request Command shown in FIG. 9A and FIG. 9B and Association Status field of the Association Response Command shown in FIG. 9C, where FIG. 9A depicts the Capability Information field of the Association Request Command and FIG. 9B shows Capability Information field of the DSME Association Request Command with DSME standing for Deterministic and Synchronous Multichannel Extension. More specifically, when IEEE 802.15.4 devices associate with the PANC via Association Request Command, the devices set Suspendable CSMA/CA bit (bit 5) to 1 in the Capability Information field of the Association Request Command or the DSME Association Request Command to indicate their intentions to perform backoff Suspension. In response, when the PANC sends back Association Response Command to devices, the PANC sets Association Status of the Association Response Command to 0x04 to indicate Suspendable CSMA/CA association successful, i.e., association is successful and backoff suspension is permitted. If devices receive Association Response Command with association status as 0x04, the devices set their Suspendable CSMA/CA field to 1. Otherwise, if Association Status is not 0x04, the Suspendable CSMA/CA field remains 0, i.e., the backoff suspension is not allowed. The PANC can determine backoff suspension permission based on region regulator or application requirement or network performance or number of devices intended to perform backoff suspension or combination thereof.

Even if the association status of the Association Response Command is 0x04, IEEE 802.15.4 devices may choose not to perform backoff suspension, e.g., if there is no traffic congestion or device energy supply is constrained.

Figure 5A:
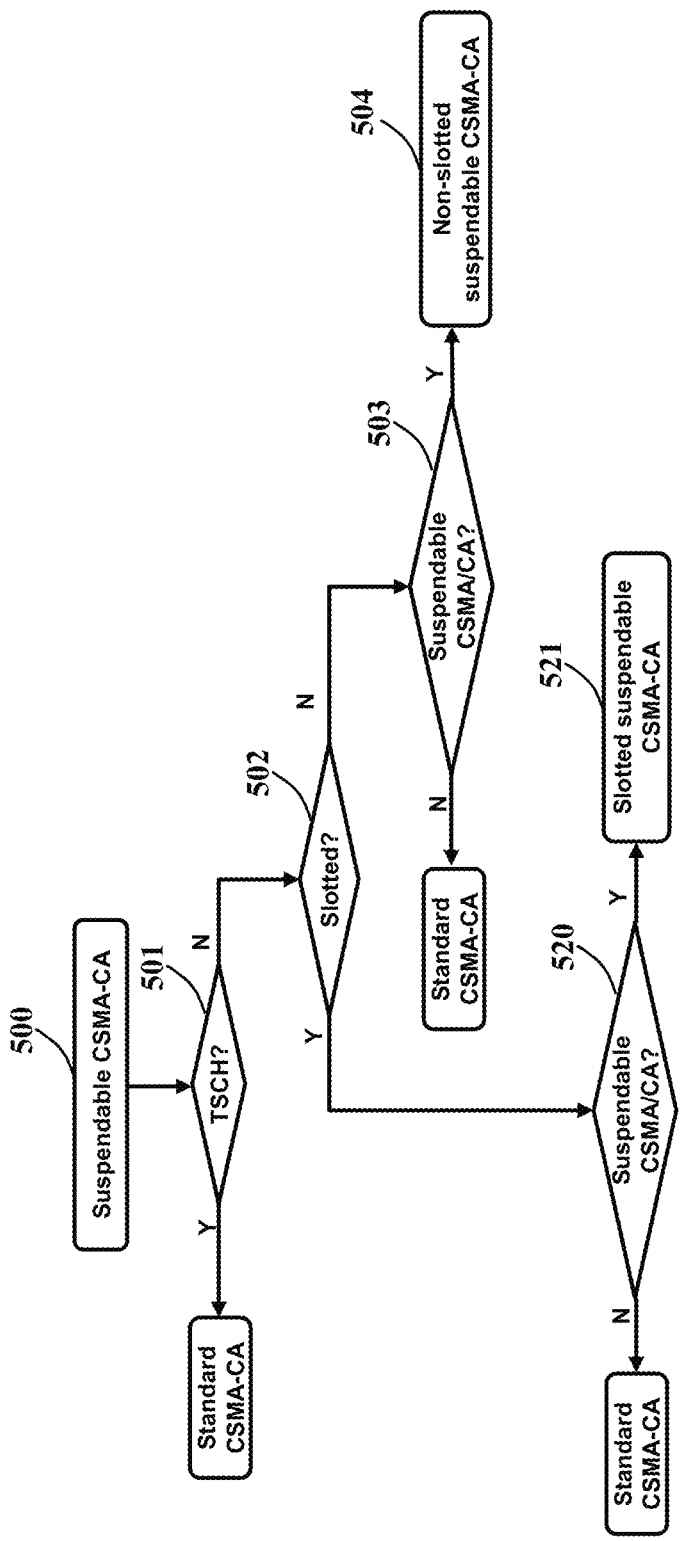
FIG. 5A shows flow chart of the suspendable carrier sense multiple access with collision avoidance (CSMA/CA) mechanism for IEEE 802.15.4 to support suspendable backoff, according to embodiments of the present invention.

FIG. 5A shows the flow chart of the invented Suspendable CSMA/CA mechanism 500 for IEEE 802.15.4 to support backoff suspension. The invented CSMA/CA allows IEEE 802.15.4 devices to perform backoff suspension to avoid channel access failure packet discard.

The invented Suspendable CSMA/CA mechanism 500 checks if IEEE 802.15.4 network is TSCH network or not 501. If yes, standard CSMA-CA algorithm is invoked. Otherwise, Suspendable CSMA/CA mechanism checks if IEEE 802.15.4 network is slotted network or not 502. For the non-slotted network, the invented Suspendable CSMA/CA mechanism checks 503 if backoff suspension is allowed, i.e., Suspendable CSMA/CA field=1 or 0. If Suspendable CSMA/CA field=1 and device intends to perform backoff suspension, the invented Suspendable CSMA/CA mechanism goes to non-slotted Suspendable CSMA-CA algorithm 504. Otherwise, Suspendable CSMA/CA mechanism invokes standard CSMA-CA algorithm. For the slotted IEEE 802.15.4 network, the invented Suspendable CSMA/CA mechanism checks 520 if backoff suspension is allowed, i.e., Suspendable CSMA/CA field=1 or 0. If Suspendable CSMA/CA field=1 and device intends to perform backoff suspension, the invented Suspendable CSMA/CA mechanism goes to slotted Suspendable CSMA-CA algorithm 521. Otherwise, Suspendable CSMA/CA mechanism invokes standard CSMA-CA algorithm.

Figure 5B:
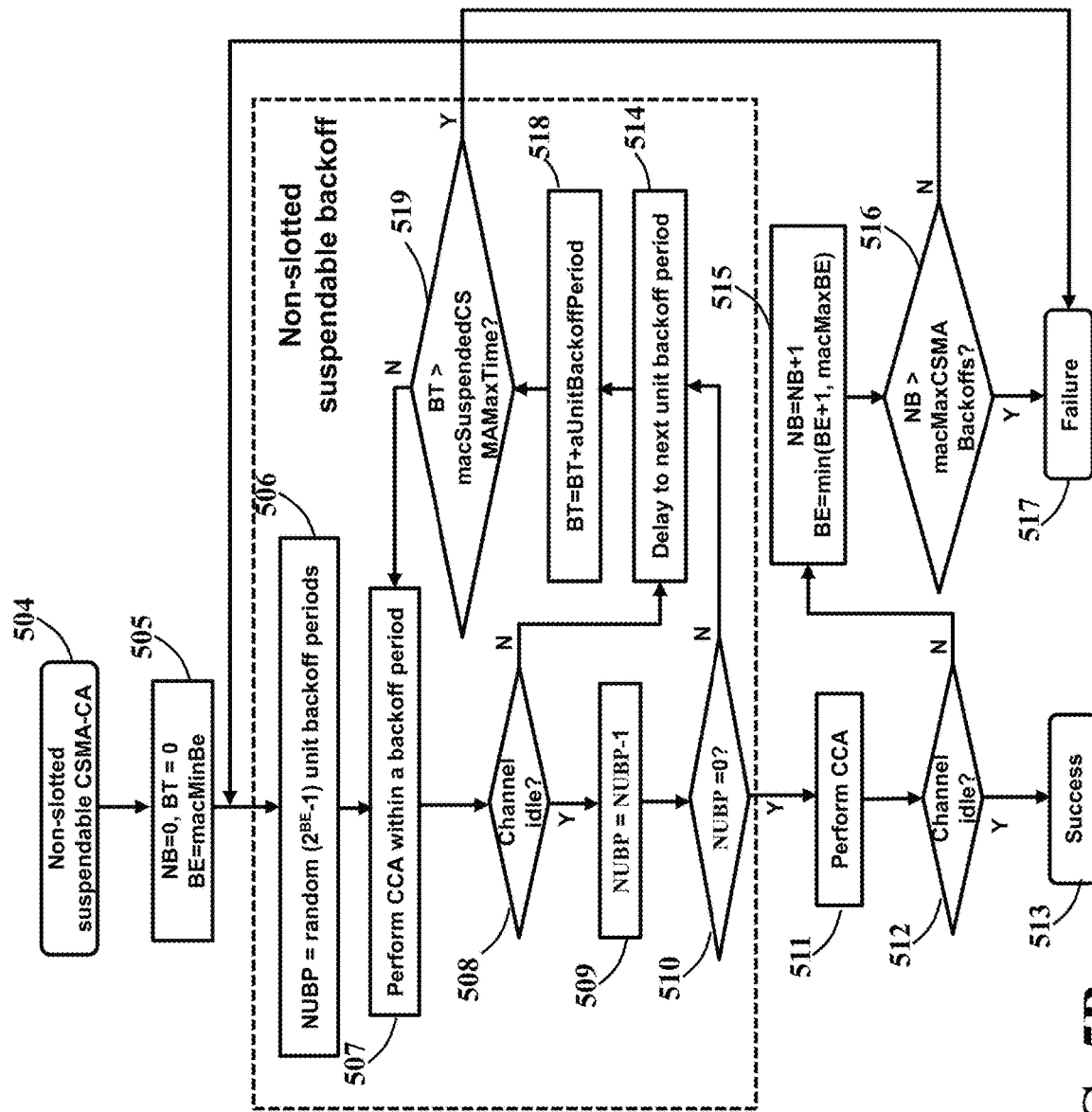
FIG. 5B shows flow chart of the suspendable carrier sense multiple access with collision avoidance (CSMA/CA) method for non-slotted IEEE 802.15.4 networks, according to embodiments of the present invention.
Figure 6:
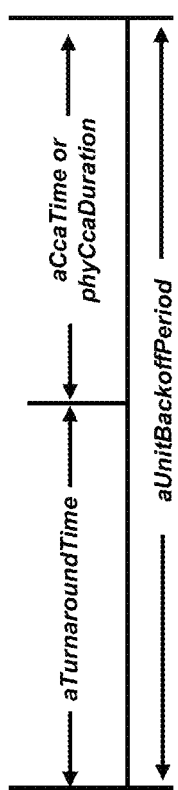
FIG. 6 shows the structure of the unit backoff period specified in IEEE 802.15.4, according to embodiments of the present invention.
Figure 7A:
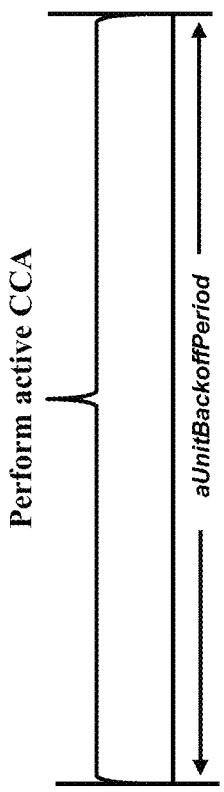
FIG. 7A shows an example of performing active CCA during entire unit backoff period, according to embodiments of the present invention.
Figure 7B:
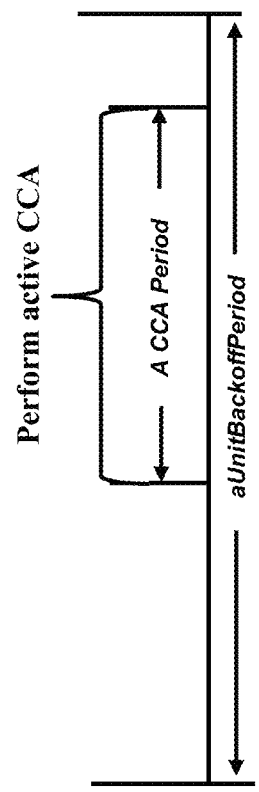
FIG. 7B shows an example of performing active CCA in a CCA period located within a unit backoff period, according to embodiments of the present invention.
Figure 7C:
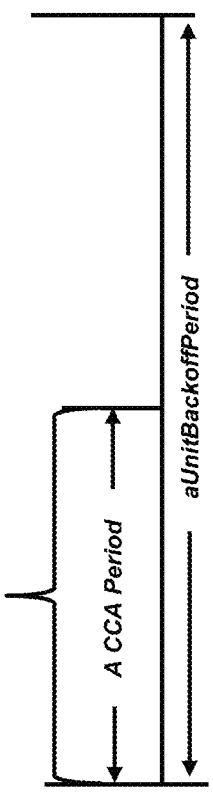
FIG. 7C shows an example of performing active CCA in a CCA period starting at boundary of a unit backoff period, according to embodiments of the present invention.

FIG. 5B shows the non-slotted Suspendable CSMA-CA algorithm 504. The non-slotted Suspendable CSMA-CA algorithm sets 505 NB=0, BT=0 and BE=macMinBE, uniformly draws 506 a random number of unit backoff periods within $[0, 2^{BE}-1]$ and sets number of unit backoff periods (NUBP) to the random number drawn. The non-slotted Suspendable CSMA-CA algorithm then performs 507 active CCA within a unit backoff period as shown in FIG. 7A or 7B or 7C. If channel is busy 508, the non-slotted Suspendable CSMA-CA algorithm waits 514 until the next unit backoff period. The non-slotted Suspendable CSMA-CA algorithm then updates 518 backoff time (BT) as BT=BT+aUnitBackoffPeriod, where aUnitBackoffPeriod is sum of aTurnaroundTime and aCcaTime as shown in FIG. 6. The non-slotted Suspendable CSMA-CA algorithm checks 519 if BT exceeds the threshold macSuspendedCSMAMaxTime. If no, the non-slotted Suspendable CSMA-CA algorithm performs 507 active CCA again. In this case, NUBP is not decreased, in other words, backoff is suspended because all backoff variables NB, CW and BE are not updated. If BT exceeds the threshold macSuspendedCSMAMaxTime, the non-slotted Suspendable CSMA-CA algorithm terminates with failure status 517. If channel is idle 508, the non-slotted Suspendable CSMA-CA algorithm decreases 509 NUBP by 1. If the NUBP 510 is not 0, then backoff has not completed. Therefore, the non-slotted Suspendable CSMA-CA algorithm waits 514 until the next unit backoff period. The non-slotted Suspendable CSMA-CA algorithm updates 518 backoff time BT as BT=BT+aUnitBackoffPeriod. The non-slotted Suspendable CSMA-CA algorithm checks 519 if BT exceeds the threshold macSuspendedCSMAMaxTime. If no, the non-slotted Suspendable CSMA-CA algorithm performs 507 active CCA again. If BT exceeds the threshold macSuspendedCSMAMaxTime, the non-slotted Suspendable CSMA-CA algorithm terminates with failure status 517. Otherwise, if NUBP 510 is 0, the backoff has been completed. Then non-slotted Suspendable CSMA-CA algorithm performs 511 standard CCA. If channel is idle 512, backoff successes 513. Otherwise, if channel is busy 512, the non-slotted Suspendable CSMA-CA algorithm increases 515 NB by 1 and updates BE as BE=min{BE+1, macMaxBE}. If NB exceeds 516 the predefined threshold macMaxCSMABackoffs, the non-slotted Suspendable CSMA-CA algorithm fails 517. Otherwise, the non-slotted Suspendable CSMA-CA algorithm performs another round of backoff.

Figure 5C:
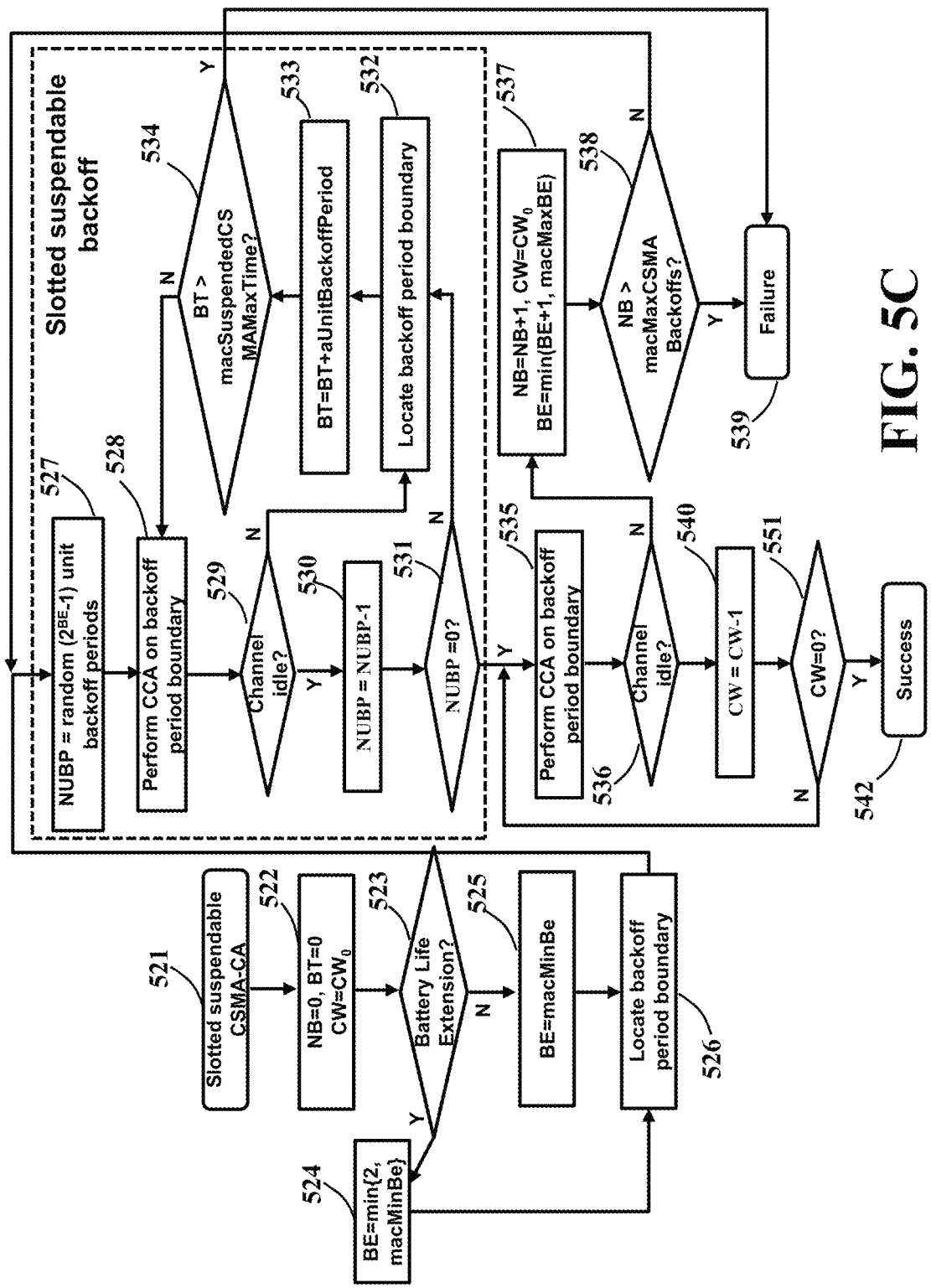
FIG. 5C shows flow chart of the suspendable carrier sense multiple access with collision avoidance (CSMA/CA) method for slotted IEEE 802.15.4 networks, according to embodiments of the present invention.

FIG. 5C shows the slotted Suspendable CSMA-CA algorithm 521. The slotted Suspendable CSMA-CA algorithm sets 522 NB=0, BT=0 and CW=CW$_0$. If Battery Life Extension is enabled 523, BE is set as BE=min{2, macMinBE} 524. Otherwise, BE is set to macMinBE 525. The slotted Suspendable CSMA-CA algorithm then locates backoff period boundary 526. At backoff period boundary, the slotted Suspendable CSMA-CA algorithm uniformly draws 527 a random number of unit backoff periods within $[0, 2^{BE}-1]$ and sets number of unit backoff periods (NUBP) to the random number drawn. The Suspendable CSMA-CA algorithm then performs 528 active CCA on backoff period boundary as shown in FIG. 7A or 7C. If channel is busy 529, the slotted Suspendable CSMA-CA algorithm locates 532 backoff period boundary and updates BT as BT=BT+aUnitBackoffPeriod 533. The slotted Suspendable CSMA-CA algorithm checks 534 whether BT exceeds the threshold macSuspendedCSMAMaxTime. If yes, the slotted Suspendable CSMA-CA algorithm terminates with failure status 539. Otherwise, the slotted Suspendable CSMA-CA algorithm performs 528 active CCA on backoff period boundary again. In this case, NUBP is not decreased, in other words, backoff is suspended because all backoff variables NB, CW and BE are not updated. If channel is idle 529, the slotted Suspendable CSMA-CA algorithm decreases 530 NUBP by 1. If the NUBP 531 is not 0, then backoff has not completed. Therefore, the slotted Suspendable CSMA-CA algorithm locates backoff period boundary 432 and updates BT as BT=BT+aUnitBackoffPeriod 533. The slotted Suspendable CSMA-CA algorithm checks 534 whether BT exceeds the threshold macSuspendedCSMAMaxTime. If yes, the slotted Suspendable CSMA-CA algorithm terminates with failure status 539. Otherwise, the slotted Suspendable CSMA-CA algorithm performs 528 active CCA on backoff period boundary again. Otherwise, if NUBP 531 is 0, then backoff has been completed. Then slotted Suspendable CSMA-CA algorithm performs 535 standard CCA on backoff period boundary. If channel is idle 536, the slotted Suspendable CSMA-CA algorithm updates 540 CW as CW=CW−1. If CW equals 541 to 0, the slotted Suspendable CSMA-CA algorithm successes 542. Otherwise, the slotted Suspendable CSMA-CA algorithm performs 535 CCA on backoff boundary again. if channel is busy 536, the slotted Suspendable CSMA-CA algorithm updates 537 NB, CW and BE as NB=NB+1, CW=CW$_0$ and BE=min{BE+1, macMaxBE}. If NB exceeds 538 the predefined threshold macMaxCSMABackoffs, the slotted Suspendable CSMA-CA algorithm fails 539. Otherwise, the slotted Suspendable CSMA-CA algorithm performs another round of backoff.

Key differences between standard CSMA/CA algorithm and Suspendable CSMA/CA algorithm:

Suspendable CSMA/CA algorithm performs CCA in each unit backoff period, standard CSMA/CA algorithm does not perform CCA during entire backoff process.

Suspendable CSMA/CA algorithm performs CCA 511 or CCA 535 only if channel in the last unit backoff period is detected to be idle. On the other hand, standard CSMA/CA algorithm performs CCA 511 or CCA 535 no matter channel in the last unit backoff period is busy or idle.

Suspendable CSMA/CA algorithm increases NB only if other transmission starts within CCA period where CCA 511 or CCA 535 is being performed. On the other hand, standard CSMA/CA algorithm increases NB no matter other transmission starts before CCA period or within CCA period where CCA 511 or CCA 535 is being performed. Accordingly, standard CSMA/CA algorithm has greater probability to increase NB, which in turn causes more chance of backoff failure.

By performing active CCA, suspendable CSMA/CA algorithm has capability to avoid packet discard caused by interference from non-IEEE 802.15.4 devices such as IEEE 802.11 devices.

In summary, suspendable CSMA/CA algorithm can reduce the chance of backoff failure.

In IEEE 802.15.4 standard, a unit backoff period is longer than a CCA period. FIG. 6 shows the structure of the unit backoff period, which includes aTurnaroundTime plus a CCA period. The CCA period equals to aCcaTime for all PHYs except SUN PHYs operating in the 920 MHz band and equals to phyCcaDuration for SUN PHYs operating in the 920 MHz band. This indicates that to perform active CCA 507 within a unit backoff period or active CCA 528 on backoff period boundary, CSMA/CA algorithm has multiple choices. It can perform CCA during entire unit backoff period or during a portion of unit backoff period. FIG. 7A shows an example, in which CSMA/CA algorithm performs active CCA during entire unit backoff period. FIG. 7B shows an example, in which CSMA/CA algorithm performs active CCA within a CCA period located within a unit backoff period. This scenario applies to non-slotted Suspendable CSMA/CA only. FIG. 7C shows an example, in which CSMA/CA algorithm performs active CCA within a CCA period starting at boundary of a unit backoff period.

Figure 8:
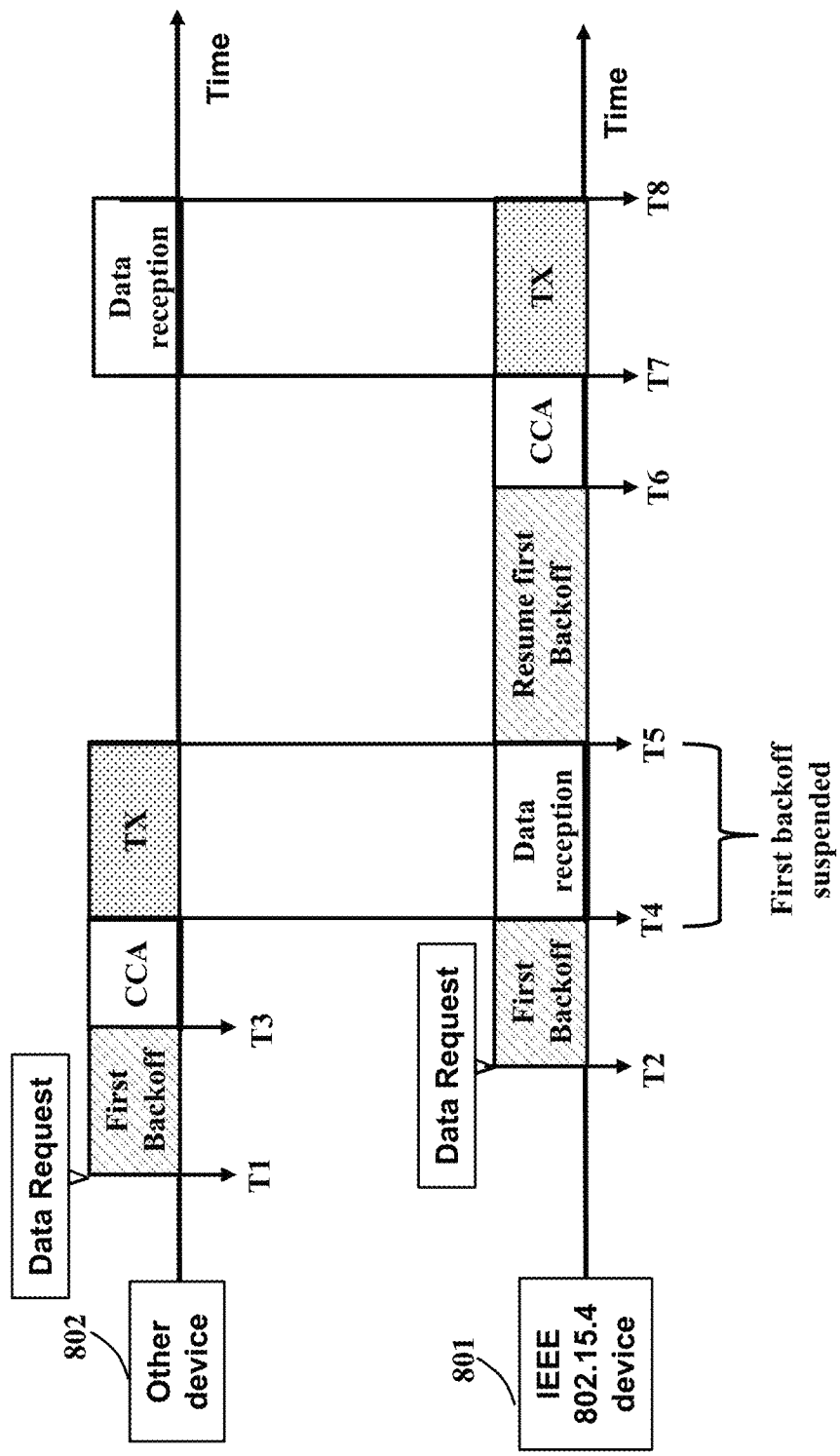
FIG. 8 illustrates an example of backoff suspension execution provided in suspendable CSMA/CA mechanism, according to embodiments of the present invention.

FIG. 8 shows an example of non-slotted Suspendable CSMA-CA algorithm execution, in which there is an IEEE 802.15.4 device 801 and other device 802, where other device 802 can be an IEEE 802.15.4 device or non-IEEE 802.15.4 device such as IEEE 802.11 device. At time T1, other device receives a data request and therefore, device 802 starts first backoff. At time T2, IEEE 802.15.4 device 801 receives a data request and therefore, it also starts first backoff. At time T3, other device 802 completes first backoff and starts CCA operation. At time T4, other device 802 finishes CCA and detects channel to be idle. Therefore, Other device 802 starts transmission. At same time T4, IEEE 802.15.4 device 801 detects transmission by other device 802 and therefore, suspends its first backoff and performs data reception if other device 802 is an IEEE 802.15.4 device. At time T5, other device 802 finishes transmission and channel becomes idle. Therefore, IEEE 802.15.4 device 801 resumes its first backoff. At time T6, IEEE 802.15.4 device completes its first backoff and starts CCA operation. At time T7, IEEE 802.15.4 device 801 finishes CCA and channel is idle. Therefore, it starts data transmission. At same time, other device 802 starts data reception if other device 802 is an IEEE 802.15.4 device. Finally, at time T8, IEEE 802.15.4 device 801 finishes data transmission.

It should be noticed that if other device 802 is a non-IEEE 802.15.4 device, devices 801 and 802 cannot receive data from each other. However, they can interfere with each other. By performing Suspendable CSMA/CA algorithm, IEEE 802.15.4 device 801 can avoid packet discard caused by interference.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A computer-executed method for performing a suspendable carrier-sense multiple access with collision avoidance (CSMA/CA) control program in an IEEE 802.15.4 network composing of IEEE 802.15.4 devices, wherein the computer-executed method causes a processor of the IEEE 802.15.4 device to perform steps that comprise:

determining permission of backoff suspension by receiving an Association Response Command from a network manager of the IEEE 802.15.4 network;

obtaining intention of the IEEE 802.15.4 device to perform a backoff suspension contained in a suspendable CSMA/CA field of an Association Request Command;

selecting a suspendable CSMA/CA control program from a memory if the backoff suspension is permitted and the IEEE 802.15.4 device intends to perform the backoff suspension, wherein the suspendable CSMA/CA control program performs steps of:

performing active CCA within each of unit backoff periods;

suspending a backoff process when a channel status of the IEEE 802.15.4 network is detected to be busy; and resuming the backoff process once the channel status is detected to be idle; and determining if a backoff time exceeds a pre-defined threshold macSuspendedCSMAMaxTime; and, in response to determining the backoff time not exceeding the pre-defined threshold macSuspendedCSMAMaxTime, transmitting a data frame when the detected channel status is idle or incrementing a number of backoffs (NB) when the detected channel status is a busy state;

determining if the NB exceeds a macMaxCSMABackoffs;

incrementing a number of retransmissions (NR) when the NB exceeds the macMaxCSMABackoffs, and discarding the data frame when the NR exceeds a macMaxFrameRetries.

2. The method of claim 1, wherein the IEEE 802.15.4 device applies a standard CSMA/CA channel access mechanism if the backoff suspension is not permitted, wherein the IEEE 802.15.4 device applies a suspendable CSMA/CA channel access mechanism if the backoff suspension is permitted, wherein the suspendable CSMA/CA channel access mechanism can be a non-slotted Suspendable CSMA-CA algorithm or a slotted Suspendable CSMA-CA algorithm.

3. The method of claim 1, wherein the backoff suspension is permitted by a network manager of a Personal Area Network Coordinator (PANC) based on a region regulator or an application requirement or a network performance or a number of IEEE 802.15.4 devices intend to perform backoff suspension or combination thereof.

4. The method of claim 3, wherein the network manager provides the backoff suspension permission to IEEE 802.15.4 devices during network construction process or IEEE 802.15.4 devices dynamically request backoff permission from the network manager.

5. The method of claim 4, wherein the IEEE 802.15.4 devices choose not to perform the backoff suspension even if the backoff suspension is permitted.

6. The method of claim 1, wherein the IEEE 802.15.4 device that executes the backoff suspension to perform the active CCA within each of the unit backoff periods and suspends backoff if channel is detected to be busy, wherein a suspendable CSMA/CA channel access mechanism fails if the number of backoffs exceeds a threshold macMaxCSMABackoffs or the backoff time exceeds a threshold macSuspendedCSMAMaxTime.

7. The method of claim 6, wherein the IEEE 802.15.4 device that performs suspendable CSMA/CA first draws a random number of unit backoff periods (NUBP) within [0, $2^{BE}-1$], then performs the active CCA within each of the unit backoff periods, wherein backoff is suspended (i.e., NUBP is not decreased) if channel is busy, wherein the backoff process continues if channel is idle, wherein the backoff process is completed once NUBP reaches to zero.

8. The method of claim 6, wherein the IEEE 802.15.4 device performs standard CCA within a CCA period once number of unit backoff periods (NUBP) reaches to zero.

9. The method of claim 8, wherein the IEEE 802.15.4 device transmits data if CCA reports idle channel, wherein a CSMA/CA algorithm reports backoff failure if the CCA reports busy channel and number of backoffs (NB) is increased by 1.

10. The method of claim 9, wherein the CSMA/CA algorithm reports channel access failure if number of backoffs (NB) exceeds a pre-defined macMaxCSMABackoffs, wherein the number of retransmissions (NR) is incremented by 1 if the CSMA/CA algorithm reports channel access failure.

11. The method of claim 10, wherein the IEEE 802.15.4 MAC discards data if number of retransmissions (NR) exceeds macMaxFrameRetries.

12. The method of claim 6, wherein the IEEE 802.15.4 device can perform active CCA during entire unit backoff period or during portion of unit backoff period.

13. A network device for performing suspendable carrier-sense multiple access with collision avoidance (CSMA/CA) in an IEEE 802.15.4 network, comprising:
a processor; and
a memory configured to store a CSMA/CA mode control program that causes the processor to perform steps of:
determining permission of backoff suspension by receiving an Association Response Command from a network manager of the IEEE 802.15.4 network;
obtaining intention of the IEEE 802.15.4 device to perform backoff suspension contained in a suspendable CSMA/CA field of an Association Request Command;
selecting a suspendable CSMA/CA control program from the memory if the backoff suspension is permitted and the IEEE 802.15.4 device intends to perform the backoff suspension, wherein the suspendable CSMA/CA control program is configured to perform:
performing active CCA within each of unit backoff periods;
suspending a backoff process when a channel of the IEEE 802.15.4 network is detected to be busy; and
resuming the backoff process once a state of the channel is detected to be idle; and
determining if a backoff time exceeds a pre-defined threshold macSuspendedCSMAMaxTime; and, in response to determining the backoff time not exceeding the pre-defined threshold macSuspendedCSMAMaxTime, transmitting data frame when a detected status is idle or incrementing a number of backoffs (NB) when the detected channel status is a busy state;
determining if the NB exceeds a macMaxCSMABackoffs;
incrementing a number of retransmissions (NR) when the NB exceeds the macMaxCSMABackoffs, and
discarding the data frame when the NR exceeds a macMaxFrameRetries.

14. The network device of claim 13, wherein the network device applies a standard CSMA/CA channel access mechanism if the backoff suspension is not permitted, wherein the network device applies a suspendable CSMA/CA channel access mechanism if the backoff suspension is permitted, wherein the suspendable CSMA/CA channel access mechanism can be a non-slotted Suspendable CSMA-CA algorithm or a slotted Suspendable CSMA-CA algorithm.

15. The network device of claim 13, wherein the backoff suspension permission is determined by the network manager or a region regulator or an application developer or combination thereof.

16. The network device of claim 15, wherein the network manager provides the backoff suspension permission to network devices during network construction process or network devices in the IEEE 802.15.4 network dynamically request backoff permission from the network manager.

17. The network device of claim 16, wherein other network devices choose not to perform the backoff suspension even if the backoff suspension is permitted.

18. The network device of claim 13, wherein the network device executes the backoff suspension to perform the active CCA within each of the unit backoff periods and suspends the backoff process if channel is detected to be busy, wherein the suspendable CSMA/CA channel access mechanism fails if the number of backoffs exceeds the threshold macMaxCSMABackoffs or the backoff time exceeds the threshold macSuspendedCSMAMaxTime.

19. The network device of claim 18, wherein the network device performs a suspendable CSMA/CA first and draws a random number of unit backoff periods (NUBP) within [0, $2^{BE}-1$], then performs the active CCA within each of the unit backoff periods, wherein backoff is suspended (i.e., NUBP is not decreased) if channel is busy, wherein the backoff process continues if channel is idle, wherein the backoff process is completed once NUBP reaches to zero.

20. The network device of claim 18, wherein the IEEE 802.15.4 device performs standard CCA within a CCA period once number of unit backoff periods (NUBP) reaches to zero.

* * * * *